(12) United States Patent
Yamamoto et al.

(10) Patent No.: US 9,707,606 B2
(45) Date of Patent: Jul. 18, 2017

(54) EXTRUSION PRESS MACHINE

(71) Applicant: Ube Machinery Corporation, Ltd., Ube-shi (JP)

(72) Inventors: Takeharu Yamamoto, Ube (JP); Yukio Emoto, Ube (JP)

(73) Assignee: Ube Machinery Corporation (JP)

(*) Notice: Subject to any disclaimer, the term of this patent is extended or adjusted under 35 U.S.C. 154(b) by 0 days.

(21) Appl. No.: 14/391,878

(22) PCT Filed: Feb. 26, 2013

(86) PCT No.: PCT/JP2013/054942
§ 371 (c)(1),
(2) Date: Oct. 10, 2014

(87) PCT Pub. No.: WO2013/153861
PCT Pub. Date: Oct. 17, 2013

(65) Prior Publication Data
US 2015/0107324 A1    Apr. 23, 2015

(30) Foreign Application Priority Data

Apr. 13, 2012 (JP) ................... 2012-091896

(51) Int. Cl.
*B21C 23/21* (2006.01)
*B21C 31/00* (2006.01)
(Continued)

(52) U.S. Cl.
CPC ............ *B21C 23/211* (2013.01); *B21C 23/01* (2013.01); *B21C 27/04* (2013.01); *B21C 31/00* (2013.01); *B21C 23/215* (2013.01); *B29C 45/07* (2013.01)

(58) Field of Classification Search
CPC ....... B21C 23/211; B21C 23/01; B21C 23/08; B21C 23/215; B21C 31/00; B21C 23/218;
(Continued)

(56) References Cited

U.S. PATENT DOCUMENTS

| 3,559,436 | A | * | 2/1971 | Nilsson | ................. B21C 23/007 |
| | | | | | 72/272 |
| 4,424,696 | A | * | 1/1984 | Asari | ................... B21C 23/211 |
| | | | | | 72/272 |
| 6,484,548 | B2 | * | 11/2002 | Siemer | .................. B21C 23/211 |
| | | | | | 100/269.08 |

FOREIGN PATENT DOCUMENTS

| IT | EP 0531612 A1 * | 3/1993 | .......... B21C 23/211 |
| JP | 05-212435 A | 8/1993 | |

(Continued)

OTHER PUBLICATIONS

Machine translation of JP05212435A from Espacenet.*
(Continued)

*Primary Examiner* — Peter DungBa Vo
*Assistant Examiner* — John S Lowe
(74) *Attorney, Agent, or Firm* — DLA Piper LLP (US)

(57) ABSTRACT

An extrusion press machine includes an end platen, a die, a container, container cylinders which move the container back and forth, a stem that pushes a billet in the container, and a main cylinder at the front end of the stem is provided and by which the stem can freely slide front and back, the extrusion press machine further including a plurality of hydraulic valves that supply hydraulic oil in the main cylinder to the container cylinders and which operate before the stem and the container retract in movement when discharging compressed air in the container after upset of the billet and further including a hydraulic valve that discharges hydraulic oil in the main cylinder into a tank, the hydraulic valves connected by a hydraulic pipeline, and the main
(Continued)

cylinder and the container cylinders being able to be connected.

1 Claim, 3 Drawing Sheets

(51) Int. Cl.
B21C 23/01 (2006.01)
B21C 27/04 (2006.01)
B29C 45/07 (2006.01)
(58) Field of Classification Search
CPC ......... B21C 27/04; B21C 35/04; B21C 33/00;
B21C 27/00; B21C 23/007; B21C 23/21;
B29C 2045/824; B29C 45/5008; B29C
45/68; B29C 45/07; F16J 10/02
USPC ... 72/20.1, 270–273, 273.5, 60, 21.5, 253.1,
72/254, 31.13, 342.3, 453.06, 453.18;
100/215, 269.08, 269.14
See application file for complete search history.

(56) References Cited

FOREIGN PATENT DOCUMENTS

| JP | 05-220597 A | | 8/1993 |
|---|---|---|---|
| JP | 05212435 A | * | 8/1993 |
| JP | 2001-252714 A | | 9/2001 |
| JP | 2010-144840 A | | 7/2010 |

OTHER PUBLICATIONS

Attached machine translation as well as file pdf of original of JP 05212435A.*
English version of EP0531612A1 is attached.*
Japanese Notice of Reasons for Rejection dated May 7, 2013 from corresponding Japanese Patent Application No. 2012-091896 and its English translation.
Chinese Office Action dated May 4, 2015 of corresponding Chinese Application No. 2013800194797 along with its English translation.

* cited by examiner

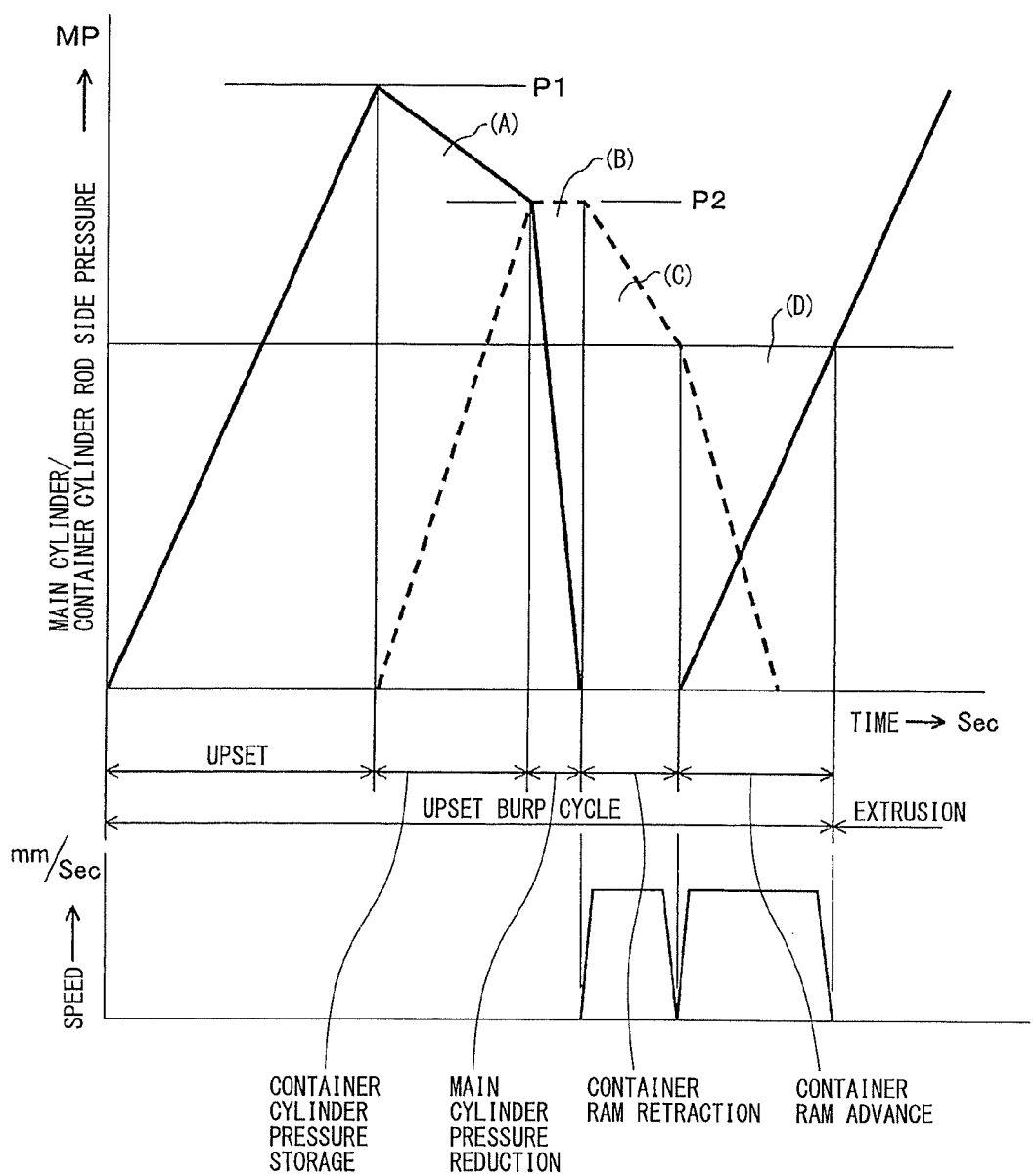

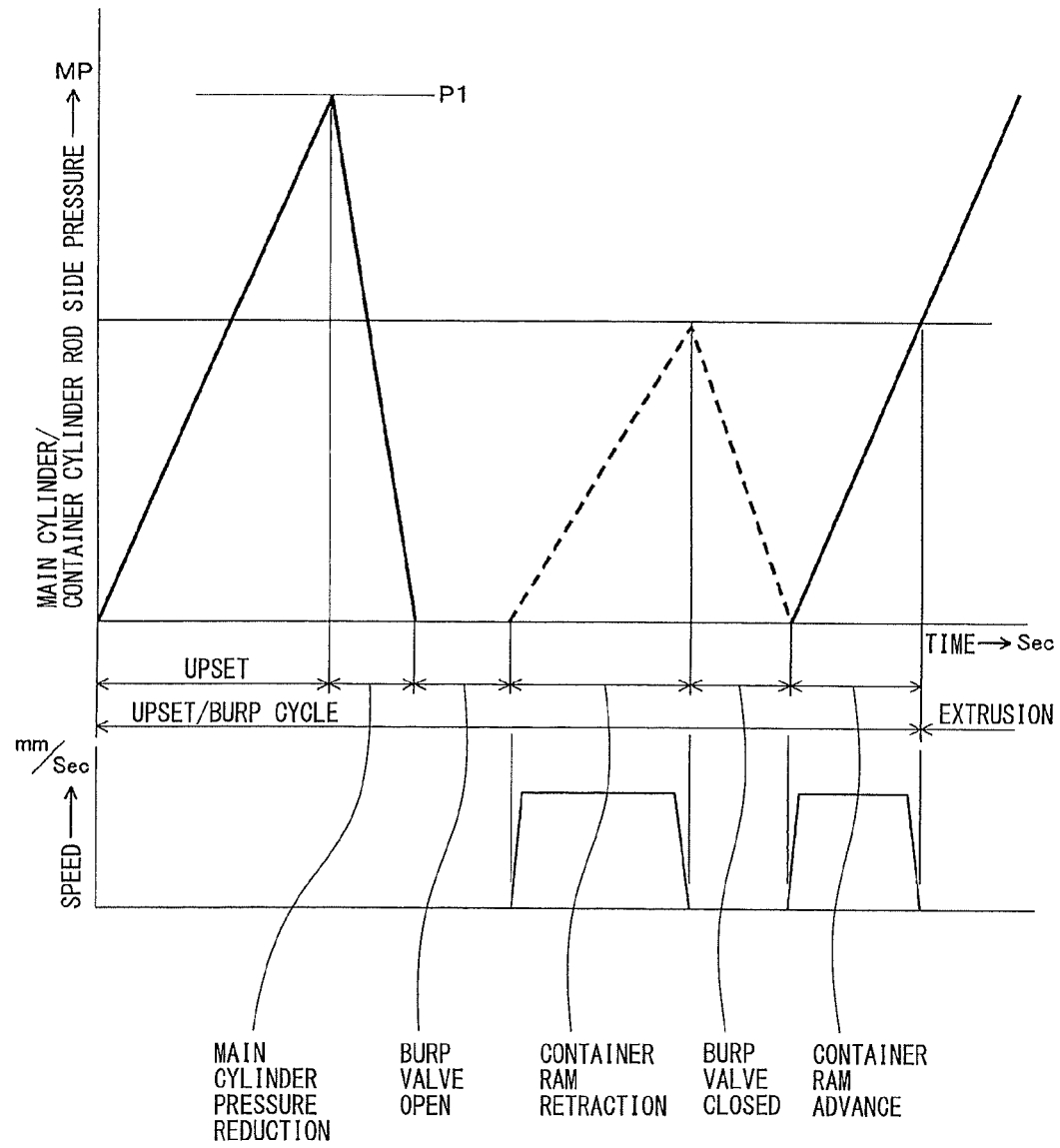

EXTRUSION PRESS MACHINE

TECHNICAL FIELD

The present invention relates to an extrusion press machine, and more specifically relates to an extrusion press machine which shortens a process time in a burp cycle.

BACKGROUND ART

In general, when extruding a billet comprised of a metal material, for example, aluminum or its alloyed material, etc., by an extrusion press machine a hydraulic cylinder drives a ram. At the front end part of the ram, a stem is attached. A container is pushed against the die. In that state, the billet is inserted into the container by the stem, etc. The ram is further advanced by operation of the hydraulic cylinder whereby the billet is pushed by the stem. Then, a shaped product is extruded from the exit part of the die.

After the billet, which is made smaller in diameter than the inside diameter of the container, is inserted in the container, if the billet is pushed inside the container against the die by the stem at the back of the billet for so-called upset, the billet is crushed, whereby the center swells resulting in a barrel shape. Between the container and the billet, in particular at the die side end face part of the inside wall of the container, air is compressed and builds up. To discharge the compressed air which has built up inside the container, the stem and the container are slightly retracted, whereby a clearance is provided between the die end face and the container end face and the compressed air is discharged, then the container and stem are again advanced to start the extrusion. The process of discharging the compressed air in the cylinder in this way is referred to as "burp cycle".

In a conventional extrusion press machine, a prefill valve is provided as a means for supplying and discharging a hydraulic oil in the main cylinder in a short time at the time of making the ram move in the main cylinder with no load. At the time of movement of the ram at the time of no extrusion, the prefill valve is unavoidably operated. Time is required at all times for operating the prefill valve from when moving by a full stroke. For this reason, if performing the burp cycle in the extrusion process, the cycle time becomes longer.

To solve this problem, a plurality of hydraulic working valves which communicate with the main cylinder and drain the hydraulic oil even in a state closing the prefill valve when refracting container cylinders and retracting the ram and are independent from the prefill valve are provided at the back part of the main cylinder in this configuration. Due to this configuration, it is possible to supply and discharge hydraulic oil in the main cylinder without operating the prefill valve at the time of the retraction operation of the ram in the burp cycle and it is possible to shorten the burp cycle time (see PLT 1).

In this regard, as shown in FIG. 3, in the conventional type of extrusion press machine which is disclosed in PLT 1, at the time of upset, the hydraulic oil which is supplied to the main cylinder is lowered in pressure by the hydraulic valve which is provided for lowering the pressure, then a hydraulic valve which is provided for the burp cycle is opened to discharge the hydraulic oil in the main cylinder to a tank during a container- and ram-retraction operation of the burp cycle and hydraulic oil is supplied from a hydraulic pump to the container cylinders to retract the ram through the container and extrusion stem. Furthermore, the hydraulic valve for burp cycle use which is opened after the completion of retraction of the container is closed, then the container and ram are advanced again. For this reason, time is required for the processes from after the completion of upset to readvance of the container and ram and time is wasted for the burp cycle process.

CITATIONS LIST

Patent Literature

PLT 1: Japanese Unexamined Patent Publication No. 5-220597A

SUMMARY OF INVENTION

Technical Problem

The present invention is made in view of the above situation and has as its object the provision of an extrusion press machine which solves the problems in the related art. Specifically, an object of the present invention is to provide an extrusion press machine which can shorten the process time of the burp cycle and sufficiently discharge the compressed air in the container before the start of extrusion.

Solution to Problem

An extrusion press machine according to a first aspect of the present invention comprises an end platen, a die, a container, container cylinders which move the container back and forth, a stem for pushing a billet in the container, and a main cylinder at the front end of which the stem is provided and by which the stem can freely slide front and back. The extrusion press machine further comprises a plurality of hydraulic valves which supply hydraulic oil in the main cylinder to the container cylinders and which operate before the stem for pushing the billet and the container retract in movement when discharging compressed air in the container after upset of the billet, and further a hydraulic valve which discharges hydraulic oil in the main cylinder into a tank, the hydraulic valves connected by a hydraulic pipeline, and the main cylinder and the container cylinders being able to be connected.

In an extrusion press machine according to a second aspect of the present invention, the hydraulic pipeline which supplies hydraulic oil inside the main cylinder to the container cylinders may be provided with an accumulator.

Advantageous Effects of Invention

In the extrusion press machine of the present invention, the hydraulic oil in the main cylinder at the time of upset of the billet is supplied through the hydraulic operating valve and hydraulic pipeline to the container cylinders, so the time for the retraction operation of the ram and container after upset is shortened and the burp cycle time can be shortened.

Further, the hydraulic energy which is built up in the main cylinder is reutilized for driving the container cylinders, so it is possible to slash the amount of consumption of drive energy in the burp cycle process.

BRIEF DESCRIPTION OF DRAWINGS

FIG. 2 is a view which explains the processes until the completion of the burp cycle of the present invention and the states of change of pressure inside the cylinder in the different processes.

FIG. 3 is a view which explains the processes until the completion of the burp cycle of the conventional extrusion press machine and the states of change of pressure inside the cylinder in the different processes.

DESCRIPTION OF EMBODIMENTS

Figure 1:
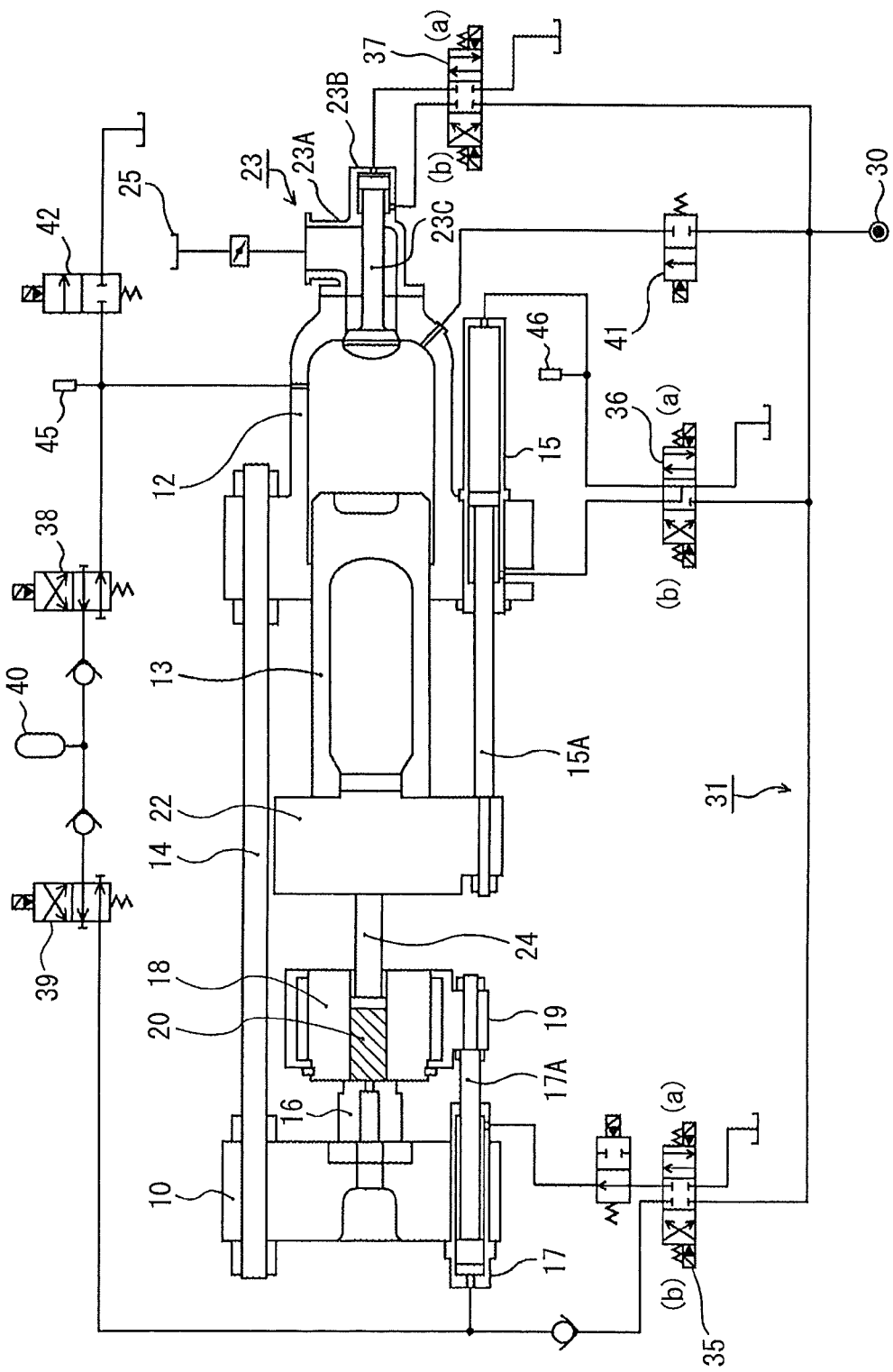
FIG. 1 is a view which explains principal parts of an extrusion press machine of the present invention.

The configuration of an extrusion press machine according to the embodiments will be explained below using the attached drawings. As shown in FIG. 1, the extrusion press machine of the present invention arranges an end platen 10 and a main cylinder 12 facing each other and connects the two by a plurality of tie rods 14. At the inside surface side of the end platen 10, a container 18 is provided across a die 16 in which an extrusion hole is formed. Inside the container 18, a billet 20 is held. By pushing the billet toward the die 16 by an extrusion stem 24, a product of a cross-section corresponding to the die hole is extruded.

The main cylinder 12 which generates the extrusion action force houses a ram 13 and can push this toward the container 18. Reference numeral 19 is a container holder to which a container 18 is attached. At the front end part of the ram 13, the extrusion stem 24 is attached to a cross head 22 in a state projecting out toward the container 18 so as to be arranged concentrically with the billet holding hole of the container. Therefore, if driving the main cylinder 12 to advance the cross head 22, the extrusion stem 24 is inserted in the billet holding hole of the container 18 and the back end part of the held billet 20 is pushed to extrude a product.

At the main cylinder 12, a plurality of side cylinders 15 are attached parallel to an extrusion axis. Rods 15A of the cylinders are connected to the cross head 22. Due to this, as a preparatory process to the extrusion process, the extrusion stem 24 is initially advanced to a position close to the container 18 (no load advance). The extrusion operation is performed using both of the main cylinder 12 and the side cylinders 15.

Further, as the process after the extrusion, the extrusion stem 24 is moved to a position separated from the container 18 for supplying a billet 20 to the container 18 (no load retraction).

On the end platen 10, a plurality of container cylinders 17 are attached parallel to the extrusion axis. Rods 17A of the cylinders are connected to the container holder 19. Due to this, the container 18 is moved to be able to approach and separate from the die 16.

Further, the main cylinder 12 is provided with a prefill valve 23 which supplies and discharges hydraulic oil inside the main cylinder 12 when moving the extrusion stem 24 to an initial extrusion position as a preparatory process and a billet supply position after end of extrusion and basically comprises a valve body 23A, prefill cylinder 23B, and valve 23C. The valve 23C is driven by the prefill cylinder 23B and opens or closes a passage between an oil tank 25 and the main cylinder 12 in accordance with the extrusion operation. The container cylinders 17 which advance and retract the container 18 are provided at the end platen 10 in this configuration, but it is also possible to provide them at the main cylinder 12 in another configuration.

Referring to FIG. 1, a hydraulic pressure circuit 31 of the extrusion press machine of the present invention will be explained. The main cylinder 12, side cylinders 15, container cylinders 17, and prefill valve 23 are connected through the hydraulic pressure circuit which is shown in FIG. 1 to a hydraulic drive source 30 whereby they are supplied with hydraulic oil.

Hydraulic oil is supplied through a solenoid directional control valve 41 to the main cylinder 12 and through a solenoid directional control valve 36 to the side cylinders 15 for the extrusion operation. Reference numeral 42 is a solenoid directional control valve which drains the hydraulic oil which is sealed under pressure in the main cylinder 12 at the time of a burp cycle after upset of the billet 20 and at the time of the end of the extrusion process. By energizing the solenoid, a throttle valve is switched to and the pressure inside the main cylinder 12 is opened through the tank line until close to atmospheric pressure.

As shown in the figure, the hydraulic pressure circuit 31 has pressure sensors 45 and 46 which detect the hydraulic pressures of the main cylinder 12, side cylinders 15, and container cylinders 17 attached to it. The pressure sensor 46 detects a predetermined pressure in the side cylinders 15 when the stem 24 advances, the billet 20 is held in the container 18, and the end face of the billet 20 abuts against the die 16. The detected pressure signal is sent to the control device whereby, under instruction by the control device, the process for holding the billet 20 is ended and the process of upset of the billet 20 is shifted to.

The pressure sensor 45 detects a predetermined pressure in the main cylinder 12 which acts on the ram 13 in the process of upset of the billet 20. The detected pressure signal is sent to a control device whereby, under instruction by the control device, the process of upset of the billet 20 is ended and the burp cycle is shifted to.

The side cylinders 15 are controlled by the solenoid directional control valve 36, the container cylinders 17 are controlled by the solenoid directional control valve 35, and the prefill valve 23 is controlled by the solenoid directional control valve 37. The desired solenoid is energized or de-energized to operate the actuators (cylinders).

Further, solenoid directional control valves 38 and 39 are provided for communicating and connecting the main cylinder 12 and the container cylinders 17 at the refraction movement side (in FIG. 1, the head side of the cylinder), while an accumulator 40 which stores the hydraulic oil is provided between the solenoid directional control valves 38 and 39.

The upset and burp cycle of the thus configured extrusion press machine will be explained with reference to FIG. 2. In FIG. 2, the change in pressure in the main cylinder 12 is shown by the solid line, the pressure inside of the container cylinders 17 (rod sides and head sides) is shown by the broken line, the ordinate shows the magnitude of the pressure, and the abscissa shows the process time of the operation.

As shown in FIG. 2, in the burp cycle in the present invention, the prefill valve 23 is closed, hydraulic oil is supplied to the main cylinder 12 through the solenoid directional control valve 41, the pressure inside the cylinder rises to a predetermined upset pressure P1 whereby the advance of the stem 24 stops (solenoid of directional control valve is de-energized), and the refraction operation of the upset ends. Further, before the start of extrusion after the end of upset, in (A) the solenoids of the solenoid directional control valves 38 and 39 are energized whereby the main cylinder 12 and the head sides of the container cylinders 17 are communicated for connection, and the hydraulic oil which is accumulated in the main cylinder 12 is supplied to the container cylinders 17. In the state where the pressure inside the main cylinder 12 and at the head sides of the container cylinders 17 becomes a predetermined pressure P2 which is balanced by the volume ratio of the two types of cylinders, the pressure storage of the container cylinders is ended and in (B) the solenoid of the directional control valve 42 is energized to release the hydraulic oil inside the main cylinder 12 to a tank (lower the pressure). The change in pressure from the pressure P1 to P2 in (A) in FIG. 2 shows the decompression of the compressed oil in the main cylinder 12.

In (C) the pressure inside of the main cylinder 12 is released whereby the pushing pressure of the extrusion stem 24 which pushes against the container 18 through the billet 20 is released and the pressure which has been stored at the head sides of the container cylinders 17 causes the container 18 to move to retract. The billet 20 sticks to the inside wall of the container, so refraction movement of the container 18 causes the billet 20, extrusion stem 24, and main cross head 22 along with the ram 13 to retract. When this retraction distance becomes about 1 mm, the deaeration is completed. Further, in (D) the solenoid directional control valves 41 and 36 are operated to supply hydraulic oil from the hydraulic drive source 30 so as to drive the ram 13 and side cylinders 15 and move the extrusion stem 24 back and forth. (The container moves back and forth through the billet. At this time, the container cylinders are opened to the tank line by a not shown hydraulic valve.) After that, the extrusion operation is started in the state where a predetermined container seal pressure is obtained.

At the time of retraction of the container and ram in the burp cycle, in a conventional extrusion press machine, as shown in FIG. 3, a predetermined amount of oil is supplied from the hydraulic pump to the container cylinders, so it is not possible to control the clearance between the container and the die by a slight stroke and time is required for operation. In the extrusion press machine according to the present invention, the hydraulic oil in the main cylinder is stored in the accumulator and is supplied to the container cylinders to be reused for the operation of the container cylinders, so the clearance between the container and the die can be controlled to a slight amount, the operating time is shortened, and the amount of energy which is required for the operation for retraction of the container can be slashed.

Furthermore, since an accumulator is used for the configuration for storing pressure based on the volume ratio of the main cylinder and container cylinders, even when the volume ratio differs, it is possible to supplement the amount of the hydraulic oil which is supplied to the container cylinders.

As explained above, in the retraction operation of the container and ram in the conventional burp cycle, instead of a configuration controlling the amount of discharge of the hydraulic pump to supply hydraulic oil to the container cylinders, a configuration is adopted which supplies hydraulic oil inside the main cylinder to slightly retract the container and ram. For this reason, there are the advantages that the burp cycle time can be shortened and the productivity of the extrusion press machine can be improved. Further, since the hydraulic oil of the main cylinder is reutilized for the retraction operation of the container and ram, the effect is exhibited that it is possible to slash the amount of energy consumed.

REFERENCE SIGNS LIST 10 end platen
12 main cylinder
13 ram
16 die
17 container cylinder
18 container
20 billet
24 extrusion stem
38, 39, 42 solenoid directional control valve
45, 46 pressure sensor
P1 upset pressure
P2 equilibrium pressure

The invention claimed is:

1. An extrusion press machine comprising an end platen, a die, a container, container cylinders which move said container back and forth, a stem for pushing a billet in the container, and a main cylinder at the front end of which the stem is provided and by which the stem can freely slide front and back, said extrusion press machine further comprising a plurality of hydraulic valves which directly supply hydraulic oil inside said main cylinder to said container cylinders and which operate before said stem for pushing the billet and said container retract in movement when discharging compressed air in the container after upset of the billet and further comprising an additional hydraulic valve which discharges hydraulic oil in said main cylinder into a tank, said plurality of hydraulic valves connected by a hydraulic pipeline, and said main cylinder and said container cylinder connected directly thereto, wherein the hydraulic pipeline which feeds the hydraulic oil in the main cylinder to the container cylinders is provided with an accumulator for pressurized fluid reuse in operation that controls clearance between the container and the die, said accumulator is positioned between said plurality of hydraulic valves, each of said plurality of hydraulic valves further comprising an adjacent check valve in a pipeline extending between the main cylinder and the container cylinders.

* * * * *